United States Patent
Barth et al.

(10) Patent No.: US 10,875,944 B2
(45) Date of Patent: Dec. 29, 2020

(54) METHOD FOR PRODUCING ACRYLIC ACID POLYMERS

(71) Applicant: BASF SE, Ludwigshafen (DE)

(72) Inventors: Johannes Barth, Shanghai (CN);
Gledison Fonseca, Ludwigshafen (DE);
Dieter Faul, Ludwigshafen (DE);
Martin Ernst, Ludwigshafen (DE);
Juergen Detering, Ludwigshafen (DE);
Ferdinand Leifeld, Ludwigshafen (DE); Gazi Tuerkoglu, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 305 days.

(21) Appl. No.: 16/074,100

(22) PCT Filed: Feb. 2, 2017

(86) PCT No.: PCT/EP2017/052191
§ 371 (c)(1),
(2) Date: Jul. 31, 2018

(87) PCT Pub. No.: WO2017/134128
PCT Pub. Date: Aug. 10, 2017

(65) Prior Publication Data
US 2020/0299426 A1    Sep. 24, 2020

(30) Foreign Application Priority Data

Feb. 4, 2016 (EP) ..................... 16154168

(51) Int. Cl.
*C08F 120/06* (2006.01)
*C11D 3/00* (2006.01)
*C11D 3/37* (2006.01)

(52) U.S. Cl.
CPC .......... *C08F 120/06* (2013.01); *C11D 3/0036* (2013.01); *C11D 3/3757* (2013.01)

(58) Field of Classification Search
CPC .... C08F 120/06; C11D 3/0036; C11D 3/3757
USPC ....................................................... 524/414
See application file for complete search history.

(56) References Cited

U.S. PATENT DOCUMENTS

| | | | |
|---|---|---|---|
| 5,216,099 A * | 6/1993 | Hughes | C08F 2/38 526/240 |
| 9,238,732 B2 * | 1/2016 | Dungworth | C08K 3/26 |
| 2012/0220707 A1 | 8/2012 | Dungworth et al. | |

FOREIGN PATENT DOCUMENTS

| | | | | |
|---|---|---|---|---|
| EP | 0372981 A2 | 6/1990 | | |
| EP | 0405818 A2 | 1/1991 | | |
| EP | 0510831 A1 | 10/1992 | | |
| EP | 0618240 A1 | 10/1994 | | |
| EP | 1074293 A1 | 2/2001 | | |
| RU | 2015141 C1 | 6/1994 | | |
| WO | WO-2012/104304 A1 | 8/2012 | | |
| WO | WO-2012/104401 A1 | 8/2012 | | |
| WO | WO-2012104304 A1 * | 8/2012 | ............ | C08F 220/06 |
| WO | WO-2012104401 A1 * | 8/2012 | .......... | B01F 17/0064 |

OTHER PUBLICATIONS

International Application No. PCT/EP2017/052191, International Preliminary Report on Patentability (English Translation), dated Aug. 9, 2018.
Cantow et al., Method of calibrating gel permeation chromatography with whole polymers, J. Polym. Sci. (Part A-1), 5:1391-4 (1967).
International Application No. PCT/EP2017/052191, International Preliminary Report on Patentability, dated Feb. 2, 2018.
International Application No. PCT/EP2017/052191, International Search Report and Written Opinion, dated May 15, 2017.
Scott et al., Kinetic study of acrylic acid solution polymerization, AIChE Journal, 43(1):135-44 (1997).

* cited by examiner

*Primary Examiner* — Michael Bernshteyn
(74) *Attorney, Agent, or Firm* — Marshall, Gerstein & Borun LLP

(57) ABSTRACT

A process for producing aqueous solutions of acrylic acid polymers by polymerization of acrylic acid in feed operation with a free-radical starter in the presence of hypophosphite in water as solvent, which comprises
(i) initially charging water and optionally acrylic acid in acidic, unneutralized form, optionally one or more ethylenicaliy unsaturated comonomers, optionally aqueous hypophosphite solution and optionally initiator,
(ii) adding acrylic acid in acidic, unneutralized form, optionally one or more ethylenicaliy unsaturated comonomers, aqueous free-radical starter solution and aqueous hypophosphite solution,
(iii) adding a base to the aqueous solution after termination of the acrylic acid feed,
wherein the comonomer content does not exceed 30 wt % based on the total monomer content, wherein the acrylic acid, the aqueous free-radical starter solution and the aqueous hypophosphite solution are added such that the molar ratio x of acrylic acid to phosphorus-bound hydrogen [AA]/[P—H] over a time period in which at least 75% of the acrylic acid is converted has a value x which is constant to within ±0.5 and is in the range from 0.8 to 2.

7 Claims, No Drawings

METHOD FOR PRODUCING ACRYLIC ACID POLYMERS

CROSS-REFERENCE TO RELATED APPLICATIONS

This is the U.S. national phase of International Application No. PCT/EP2017/052191, filed Feb. 2, 2017, which claims the benefit of European Patent Application No. 16154168.5 filed Feb. 4, 2016.

The invention relates to a process for producing aqueous solutions of acrylic acid polymers.

Dispersants, in particular polyacrylic acids, are widely used in industrial processes where a solid is converted into a pumpable dispersion. To ensure wide industrial use these dispersions, also known as slurries, need to show both good pumpability and stability in storage (low deterioration in pumpability) coupled with a high solids content. It is desirable for the latter to be raised as high as possible, owing to the high energy and transportation costs. A typical example is the use of aqueous calcium carbonate slurries in the production of graphic papers. While good flow properties on the part of the slurries substantially ensure processability in paper production and/or paper coating, the fineness of the dispersed solids determines the optical properties of the paper produced therefrom, such as the opacity for example. A lower particle size for the same solids content of the slurry results in a higher opacity of the paper produced therefrom. The particle size here is decisively influenced not only by the input of mechanical energy during the wet grinding of the pigment, but also through the choice of dispersant used.

It is known that low molecular weight polyacrylic acids produced by free-radical polymerization have good dispersing properties. The weight-average molecular weight (Mw) of these polymers should be <50 000 for good performance. Polyacrylic acids with Mw <10 000 are often particularly effective. To produce low molecular weight polyacrylic acids, molecular weight regulators/chain transfer agents are added during the free-radical polymerization of acrylic acid. These regulators have to be adapted to the polymerization initiator and also to the polymerization process. Examples of known initiators are organic and inorganic percompounds, such as peroxodisulfates, peroxides, hydroperoxides and peresters, azo compounds such as 2,2'-azobisisobutyronitrile and redox systems with organic and inorganic components.

EP-A 405 818 discloses a process for producing polymers from monoethylenically unsaturated monocarboxylic acids and optionally further monomers using sodium persulfate as starter in the presence of hypophosphite as regulator, where an alkaline neutralizer has been added during the polymerization in an amount sufficient to neutralize at least 20% of the acidic groups. The low molecular weight polymers obtained comprise at least 80% of the hypophosphite phosphorus. At least 70% of the phosphorus is reported to end up within the polymer chain as dialkyl phosphinate. The polymers thus produced are used inter alia as laundry detergent additives, dispersants for clay slurries or scale inhibitors for water treatment.

In the exemplary embodiments, acrylic acid is polymerized in water in the presence of hypophosphite as regulator and sodium persulfate as starter in feed operation wherein aqueous sodium hydroxide solution is added during the polymerization as a further continuous feed. This gives an aqueous polyacrylic acid having a weight-average molecular weight $M_w$ of 2700 g/mol, which comprises 72% of the phosphorus present in the sodium phosphite as dialkyl phosphinate, 18% as monoalkyl phosphinate and 10% in the form of inorganic salts. A comparative example dispenses with the aqueous sodium hydroxide feed and neutralizes with sodium hydroxide solution only after termination of the polymerization. This gives an aqueous polyacrylic acid having a weight-average molecular weight $M_w$ of 4320 g/mol, which comprises only 45% of the phosphorus present in the sodium phosphite as dialkyl phosphinate, 25% as monoalkyl phosphinate and 30% in the form of inorganic salts.

EP-A 510 831 discloses a process for producing polymers from monoethylenically unsaturated monocarboxylic acids, monoethylenically unsaturated dicarboxylic acids and optionally further monomers, comprising no carboxyl group, in the presence of hypophosphorous acid as chain transfer agent. At least 40% of the phosphorus incorporated into the polymer is present as monoalkyl phosphinate and monoalkyl phosphonate at the end of the polymer chain. The copolymers are used inter alia as dispersants, scale inhibitors and laundry detergent additives.

EP-A 618 240 discloses a process for polymerization of monomers in water in the presence of a water-soluble initiator and hypophosphorous acid or a salt thereof. The process is carried out such that the polymer content at the end of the polymerization is at least 50 wt %. This method makes it possible to increase the amount of hypophosphite phosphorus incorporated into the polymer. Said phosphorus is present in the polymer in the form of dialkyl phosphinate, monoalkyl phosphinate and also monoalkyl phosphonate. No information is provided as to the distribution of the phosphorus. The copolymers are used inter alia as dispersants, scale inhibitors and laundry detergent additives.

EP-A 1 074 293 discloses phosphonate-terminated polyacrylic acid having a molecular weight $M_w$ from 2000 to 5800 g/mol as a dispersant for producing aqueous slurries of calcium carbonate, kaolin, clay, talc and metal oxides having a solids content of at least 60 wt %.

WO 2012/104401 describes a process for producing aqueous solutions of acrylic acid polymers by polymerization of acrylic acid in feed operation with peroxodisulfate as starter in the presence of hypophosphite in water as solvent, which comprises initially charging water and optionally one or more ethylenicaliy unsaturated comonomers and continuously adding acrylic acid in acidic, unneutralized form, optionally one or more ethylenicaliy unsaturated comonomers, an aqueous peroxodisulfate solution and an aqueous hypophosphite solution, wherein the comonomer content does not exceed 30 wt % based on the total monomer content. The thus obtained acrylic acid polymers are characterized in that at least 76% of the total phosphorus content is present in the form of phosphinate groups bound in the polymer chain.

WO 2012/104304 describes a process for producing aqueous solutions of acrylic acid polymers by polymerization of acrylic acid in feed operation with a free-radical starter in the presence of hypophosphite in water as solvent, which comprises
(i) initially charging water and optionally one or more ethylenicaliy unsaturated comonomers,
(ii) continuously adding acrylic acid in acidic, unneutralized form, optionally one or more ethylenicaliy unsaturated comonomers, aqueous free-radical starter solution and aqueous hypophosphite solution,
(iii) adding a base to the aqueous solution after termination of the acrylic acid feed,
wherein the comonomer content does not exceed 30 wt % based on the total monomer content, wherein the aqueous hypophosphite solution is added during a total feed time made up of three consecutive feed time spans $\Delta t_I$, $\Delta t_{II}$ and $\Delta t_{III}$, wherein the average feed rate in the second feed time span $\Delta t_{II}$ is greater than the average feed rates in the first and third feed time spans $\Delta t_I$, $\Delta t_{III}$.

The aqueous solutions obtained according to WO 2012/104401 and WO 2012/104304 and the acrylic acid polymers are employed as dispersants in aqueous solids dispersions of $CaCO_3$, kaolin, talc, $TiO_2$, ZnO, $ZrO_2$, $Al_2O_3$ or MgO.

Low molecular weight homo- and copolymers based on acrylic acid are widely used as an aqueous solution or in solid form not only as effective dispersants but also as scale inhibitors in water carrying systems, for example in industrial water circuits, in desalinization plants and for machine dishwashing or as encrustation inhibitors for textile washing.

Molecular weight regulators may be organic or inorganic in nature and often comprise chemically bound sulfur or phosphorus. The disadvantage is that when relatively large amounts of regulator are employed these are not completely incorporated into the polymer and a residual content of regulator accordingly remains in the product or leads to the formation of byproducts with undesired consequences for the respective application. The subsequent removal of the regulator not incorporated into the polymer and of the byproducts is time-consuming and costly if it is even possible. When phosphorus compounds are employed the unincorporated regulator is also referred to as inorganic phosphorus. This proportion can be the originally employed phosphorus compound or a descendant product, for example an oxidation or hydrolysis product. There is a need for polymerization processes where the regulator is incorporated into the polymer very completely thus markedly reducing the content of unconverted regulator and undesired byproducts in the polymer.

Solution polymers of acrylic acid are typically produced by feed processes. These generally comprise adding at a constant dosing rate to a hot initial vessel charge comprising a solvent, typically water, a total amount m1 of acrylic acid over a time period (t1–t1.0), a total amount m2 of a free-radical starter solution over a time period (t2–t2.0) and a total amount m3 of regulator solution over a time period (t3–t3.0). The polymerization takes place in the stirred vessel in the time period (t4–t4.0), wherein t1.0, t2.0 and t3.0 determine the start of the respective feed and t4.0 determines commencement of the polymerization. The time point t1 is the end of the acrylic acid dosing, t2 is the end of the starter dosing, t3 is the end of the regulator dosing and t4 is the end of the polymerization including the postpolymerization taking place from t1 to t4.

Polymer processors demand products containing a reduced amount of byproducts and residues of process aids such as initiators and molar mass regulators. The invention has for its object the provision of a process for producing acrylic acid polymers containing a reduced amount of regulator residue and having product properties that are otherwise unchanged or improved. The amount of regulator residue is to be understood as meaning the proportion of employed regulator which is not covalently bound to a polymer chain or incorporated in a polymer chain.

The object is achieved by a process for producing aqueous solutions of acrylic acid polymers by polymerization of acrylic acid in feed operation with a free-radical starter in the presence of hypophosphite in water as solvent, which comprises
(i) initially charging water and optionally acrylic acid in acidic, unneutralized form, optionally one or more ethylenically unsaturated comonomers, optionally aqueous hypophosphite solution and optionally initiator,
(ii) adding acrylic acid, optionally one or more ethylenically unsaturated comonomers, aqueous free-radical starter solution and aqueous hypophosphite solution,
(iii) adding a base to the aqueous solution after termination of the acrylic acid feed,
wherein the comonomer content does not exceed 30 wt % based on the total monomer content, wherein the acrylic acid, the aqueous free-radical starter solution and the aqueous hypophosphite solution are added such that the molar ratio x of acrylic acid to free-radically abstractable, phosphorus-bound hydrogen [AA]/[P—H] over a time period in which at least 75% of the acrylic acid is converted has a value x which is constant to within ±0.5 and is in the range from 0.8 to 2.

The molar ratio x of acrylic acid to free-radically abstractable, phosphorus-bound hydrogen [AA]/[P—H] over a period in which at least 75% of the acrylic acid is converted is thus not less than 0.8±0.5 (i.e. can vary from 0.3 to 1.1 over this time period) and not more than 2.0±0.5 (i.e. can vary from 1.5 to 2.5 over this time period) according to the invention.

In a preferred embodiment of the invention, the molar ratio x of acrylic acid to free-radically abstractable, phosphorous-bound hydrogen [AA]/[P—H] is 1.5±0.5.

The free-radically abstractable, phosphorus-bound hydrogen is to be understood as meaning covalent hydrogen-phosphorus bonds present in the employed sodium hypophosphite (1) or in the hypophosphite terminally bound to the polymer chain (2).

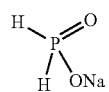

(1) Sodium hypophosphite

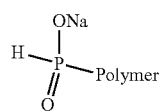

(2) terminally incorporated Sodium hypophosphite

Sodium hypophosphite and incorporated hypophosphite may be present in water in dissociated form, without sodium as a counterion, and in protonated form.

The process generally comprises adding continuously at a constant or varying dosing rate or discontinuously (portionwise) to an initial charge comprising water as solvent a total amount m1 of acrylic acid over a time period (t1–t1.0), a total amount m2 of free-radical starter solution over a time period (t2–t2.0) and a total amount m3 of aqueous hypophosphite solution over a time period (t3–t3.0). The polymerization takes place in the stirred reaction vessel in the time period (t4–t4.0), wherein the time point t4.0 determines commencement of the polymerization. The time point t1 determines the end of the acrylic acid addition, t2 determines the end of the starter addition, t3 determines the end of the regulator addition and t4 determines the end of the polymerization reaction, including the postpolymerization in the time period from t1 to t4.

A kinetic model for the copolymerization of acrylic acid in the presence of hypophosphite was used to calculate how by varying the hypophosphite dosing the residual amount of regulator, m3', not incorporated into the polymer at the end of polymerization t4 can be reduced while leaving the process otherwise unchanged. The residual amount of regulator m3' has no covalent bond with the polymer (C—P bond) and is therefore hereinbelow referred to as inorganic phosphorus.

It may be present in the form of the employed regulator (1) or in other oxidation states of hypophosphite such as phosphonic acid or phosphoric acid for example. Also possible are the dissociated, protonated and structurally isomerized forms of the respective oxidation states.

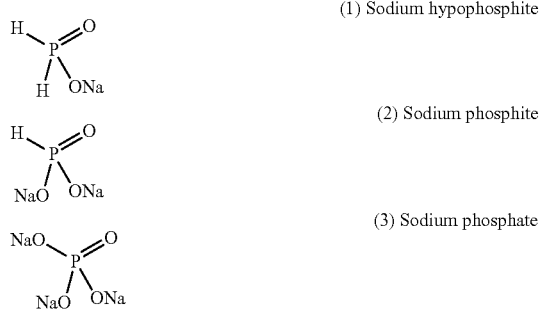

The amount of inorganic phosphorus, m3' and the proportion m3'/m3 decrease with decreasing selected feed time for the hypophosphite regulator t3–t3.0. Likewise, the amount of inorganic phosphorus m3' decreases with increasing proportional amount of hypophosphite regulator added early within the total regulator dosing time t3–t3.0. Also, m3' decreases as the total amount of dosed regulator m3 in the formulation is reduced. A suitable measure of the time-averaged dosing time point for the regulator is provided by the following parameter:

$$\bar{t}_{dosing} = \frac{1}{m3} \int_{t3.0}^{t3} (d(t) * t) dt$$

Here, t is the time from t3.0 to t3, d(t) is the dosing rate (units of mass/time) of the regulator at time point t.

The time-averaged dosing time point describes the addition of the total regulator amount as a time-based average.

For the sake of elucidation, two examples for different regulator dosings of a particular amount of regulator m3, including the initially charged regulator amount, in a particular dosing time (t3-t3.0) are reported:
a) For example, an addition of the regulator at a constant dosing rate during the entire time of the regulator dosing (t3–t3.0) results in an average dosing time point of $\bar{t}_{dosing}$=(t3–t3.0)/2.
b) For example, a higher dosing rate in the interval [t3.0–(t3–t3.0)/2] (compared to the dosing rates in a)) and a dosing rate reduced by the same amount in the interval [(t3–t3.0)/2–t3] results in an average dosing time point of $\bar{t}_{dosing}$<(t3–t3.0)/2

In a preferred embodiment of the invention all feeds commence at the same time point t0, i.e. t1.0=t2.0=t3.0=t0.

In this specific case the ratio of the time-averaged dosing time point for the regulator to the total dosing time for the acrylic acid (t1–t1.0) is <0.49, preferably <0.47, particularly preferably 0.3 to 0.47.

The ratio of the average dosing time point for the regulator to the total dosing time for the regulator is moreover generally <0.5, preferably 0.45, particularly preferably from 0.3 to 0.45.

The feeding of the hypophosphite regulator may be effected continuously or discontinuously in discrete amounts m31, m32, m33 etc. at discrete time points t31, t32, t33 etc. until time point t3.

It is evident that the molecular weight distribution is preserved despite the reduction in the amount of inorganic phosphorus (m3') when the molar ratio of the concentrations of free-radically abstractable phosphorus-bound hydrogen and acrylic acid [AA]/[P—H] momentarily present in the reaction vessel is kept constant in the range from (0.8 to 2.0)±0.5, preferably 1.5±0.5, over a time period in which at least 75% of the monomer conversion is effected by controlling the process parameters. A reduction in the conversion range during which the ratio of acrylic acid to phosphorus-bound hydrogen is kept constant results in a broadening of the molecular weight distribution (see example 3). The deviation from the preferred value [AA]/[P—H]=1.5±0.5 should be as low as possible, even outside the limits of a monomer conversion of at least 75%, to obtain a narrow molecular weight distribution. The value of [AA]/[P—H] outside the conversion range of 75% must always be less than [AA]/[P—H]=4.5.

The adherence to defined molecular weight distributions is of importance for some applications of the polymer, for example as a dispersant for calcium carbonate (see table 1).

In a preferred embodiment the molar ratio of acrylic acid to phosphorus-bound hydrogen [AA]/[P—H] over a time period in which at least 80% of the acrylic acid is converted is 1.5±0.5. The maximum value of [AA]/[P—H] outside the range of 80% of the acrylic acid conversion is not more than 4.5.

In a particularly preferred embodiment the molar ratio of acrylic acid to phosphorus-bound hydrogen [AA]/[P—H] over a time period in which at least 80% of the acrylic acid is converted is 1.5±0.25. The maximum value of [AA]/[P—H] outside the range of 80% of the acrylic acid conversion is not more than 4.5.

Moreover, a value for the molar ratio [AA]/[P—H] greater than 1.5 results in number-average molar masses higher than Mn=2800 g/mol while a value smaller than 1.5 results in number-average molar masses smaller than Mn=2800 g/mol. It is also evident that the average molar mass Mn of the polymer distribution increases linearly with the ratio [AA]/[P—H] and that the distribution breadth (measured with PDI=Mw/Mn) increases to values above PDI=1.7 when a particular ratio [AA]/[P—H] is not kept constant over a large part of the monomer conversion (>75%). This concentration ratio is obtainable by kinetic modeling or by experimental methods. The ratio [AA]/[P—H] may be determined experimentally. Preference is given to a number-average molar mass Mn of at least 2000 g/mol.

Controlling the polymerization process via the parameter [AA]/[P—H] is decisive for adjusting the molecular weight distribution since this parameter determines the kinetic chain length of the polymers. Methods for controlling [AA]/[P—H] include not only the modeling method but also experimental methods such as spectroscopy: NMR, infrared vibrational spectroscopy and inline Raman spectroscopy. Analysis of samples taken during the polymerization is also suitable. Here, sampling is effected in a provided inhibitor solution. Concentrations of acrylic acid present may be determined by HPLC, NMR spectroscopy or GC. The concentration of the P—H functionalities present may be determined by 31-P {1H} NMR spectroscopy.

The total feed time for the acrylic acid is generally 80 to 500 min, preferably 100 to 400 min.

The comonomers may be initially charged in the reaction batch, partly initially charged and partly added as a feed or exclusively added as a feed. When said comonomers are partly or completely added as a feed they are generally added simultaneously with the acrylic acid.

Water is generally added and heated to the reaction temperature of at least 75° C., preferably 90° C. to 115° C., particularly preferably 95° C. to 105° C.

An aqueous solution of phosphorous acid as corrosion inhibitor may also be initially charged.

The continuous feeds of acrylic acid, optionally of ethylenically unsaturated comonomer, starter and regulator are then started. Acrylic acid is added in unneutralized, acidic form. The feeds are generally started simultaneously. Both peroxodisulfate as starter and hypophosphite as regulator are employed in the form of their aqueous solutions.

Hypophosphite may be employed in the form of hypophosphorous acid (phosphinic acid) or in the form of salts of hypophosphorous acid. Hypophosphite is particularly preferably employed as hypophosphorous acid or as the sodium salt. Hypophosphite may be exclusively added as feed or partly initially charged. The hypophosphite content of the aqueous hypophosphite solution is preferably 35 to 70 wt %.

It is preferable when hypophosphite is employed in amounts of from 3 to 14 wt %, preferably 4 to 10 wt %, particularly preferably 5 to 8 wt %, based on the total amount of monomers.

A preferred free-radical starter is peroxodisulfate. Peroxodisulfate is generally employed in the form of the sodium, potassium or ammonium salt. The content of a preferably used aqueous peroxodisulfate solution is 5 to 10 wt %.

Peroxodisulfate is preferably employed in amounts of from 0.5 to 10 wt %, particularly preferably 0.8 to 5 wt %, based on the total amount of monomers (acrylic acid and optionally comonomers).

It is further possible to employ hydrogen peroxide as the free-radical starter, for example in the form of a 50% aqueous solution. Also suitable are redox initiators based on peroxides and hydroperoxides and reducing compounds, for example hydrogen peroxide in the presence of iron(II) sulfate and/or sodium hydroxymethanesulfinate.

The duration of the starter feed may be up to 50% longer than the duration of the acrylic acid feed. The duration of the starter feed is preferably about 3 to 20% longer than the duration of the acrylic acid feed. The total duration of the regulator feed is preferably equal to the duration of the acrylic acid feed. The total duration of the regulator feed is generally from equal to the duration of the acrylic acid feed to up to 50% shorter or longer than the duration of the acrylic acid feed.

The duration of the monomer feed or—when a comonomer is used—of the monomer feeds is, for example, 2 to 5 h. For example, when all feeds start simultaneously the regulator feed ends 10 to 30 min before the end of the monomer feed and the starter feed ends 10 to 30 min after the end of the monomer feed.

A base is generally added to the aqueous solution after termination of the acrylic acid feed. This at least partly neutralizes the acrylic acid polymer formed. Partly neutralized means that only some of the carboxyl groups presents in the acrylic acid polymer are in the salt form. Generally, sufficient base is added to ensure that the pH is subsequently in the range from 3 to 8.5, preferably 4 to 8.5, in particular 4.0 to 5.5 (partly neutralized), or 6.5 to 8.5 (completely neutralized).

The base used is preferably aqueous sodium hydroxide solution. It is also possible to employ ammonia or amines, for example triethanolamine. The thus achieved degree of neutralization of the polyacrylic acids obtained is between 15% and 100%, preferably between 30% and 100%. The neutralization is generally effected over a relatively long time period of, for example, ½ to 3 hours in order that the heat of neutralization may be readily removed.

The reaction is generally carried out under an inert gas atmosphere. This affords acrylic acid polymers where the terminally bound phosphorus is present essentially (generally to an extent of at least 90%) in the form of phosphinate groups.

In a further variant an oxidation step is carried out after termination of the polymerization. The oxidation step converts terminal phosphinate groups into terminal phosphonate groups. The oxidation is generally effected by treatment of the acrylic acid polymer with an oxidant, preferably with aqueous hydrogen peroxide solution.

Aqueous solutions of acrylic acid polymers having a solids content of generally at least 30 wt %, preferably at least 35 wt %, particularly preferably 40 to 70 wt %, in particular 50 to 70 wt %, of polymer are obtained.

The acrylic acid polymers obtainable in accordance with the invention have a total phosphorus content of organically and possibly inorganically bound phosphorus, wherein
(a) a first part of the phosphorus is present in the form of phosphinate groups bound in the polymer chain,
(b) a second part of the phosphorus is present in the form of phosphinate and/or phosphonate groups bound at the polymer chain-end,
(c) possibly a third part of the phosphorus is present in the form of dissolved inorganic salts of phosphorus, and generally at least 86% of the total phosphorus content is present in the form of phosphinate or phosphonate groups bound in the polymer chain or at the polymer chain-end.

Preferably at least 88%, particularly preferably at least 90%, of the total phosphorus content is present in the form of phosphinate groups bound in the polymer chain or at the polymer chain-end. A particularly high content of phosphorus bound in the polymer chain is obtained on account of the feed operation according to the invention.

Generally, not more than 15%, preferably not more than 10%, of the phosphorus is present in the form of dissolved inorganic phosphorus salts. It is particularly preferable when 0% to 10% and in particular 0% to 6% of the phosphorus is present in the form of dissolved inorganic phosphorus salts.

Based on the mass of the polymers the amount of dissolved inorganic phosphorus salts is preferably <0.5 wt %.

The weight-average molecular weight Mw of the acrylic acid polymer is generally 1000 to 20 000 g/mol, preferably 3500 to 12 000 g/mol, particularly preferably 3500 to 8000 g/mol, in particular 3500 to 6500 g/mol and specifically 4000 to 6500 g/mol. The molecular weight can be selectively adjusted within these ranges via the employed regulator amount.

The proportion of polymers having a weight-average molecular weight Mw of <1000 g/mol is generally ≤10 wt %, preferably ≤5 wt %, based on total polymer.

The proportion of polymers having a weight-average molecular weight Mw of >40 000 g/mol is less than 3 wt %, preferably less than 1 wt %, particularly preferably less than 0.5 wt %, based on total polymer.

The acrylic acid polymer generally has a polydispersity index $M_w/M_n$ of 2.3, preferably 1.5 to 2.1, for example 1.7.

The acrylic acid polymer may comprise up to 30 wt %, preferably up to 20%, particularly preferably up to 10 wt %, based on all ethylenicaliy unsaturated monomers, of copolymerized ethylenicaliy unsaturated comonomers. Examples of suitable ethylenically unsaturated comonomers are methacrylic acid, maleic acid, maleic anhydride, vinylsulfonic acid, allylsulfonic acid and 2-acrylamido-2-methylpropane-sulfonic acid (AMPS) and salts thereof. Mixtures of these comonomers may also be present.

Particular preference is given to acrylic acid homopolymers without a comonomer proportion.

The obtained aqueous solutions of the acrylic acid polymers may be employed directly as dispersants.

The invention also relates to the use of the aqueous solutions of the acrylic acid polymers/the acrylic acid polymers themselves as dispersing aids for inorganic pigments and fillers, for example $CaCO_3$, kaolin, talc, $TiO_2$, ZnO, $ZrO_2$, $Al_2O_3$ and MgO.

The slurries prepared therefrom are used as white pigments for graphic papers and paints, as deflocculants for the production of ceramic materials of construction or else as fillers for thermoplastics. However, the acrylic acid polymers may also be used for other purposes, for example in laundry detergents, dishwashing detergents, technical/industrial cleaners, for water treatment or as oil field chemicals. If desired they can be converted into solids, for example into powders or granules, before use by various drying methods, for example spray drying, spray granulation, roll drying or paddle drying.

Particularly preferred dispersions (slurries) for which the acrylic acid polymers according to the invention are used is ground calcium carbonate. The grinding is carried out continuously or discontinuously in aqueous suspension. The calcium carbonate content of this suspension is generally ≥50 wt %, preferably ≥60 wt % and particularly preferably ≥70 wt %. Typically, the polyacrylic acid used in accordance with the invention is employed in an amount of from 0.1 to 2 wt %, preferably 0.3 to 1.5%, in each case based on the calcium carbonate present in the suspension. After grinding, the particle size in these calcium carbonate slurries is preferably less than 2 µm for 95% of the particles and less than 1 µm for 75% of the particles. The calcium carbonate slurries obtained have excellent rheological properties and are still pumpable after several days' storage, as is evident from the viscosity profiles in table 2.

The invention also provides for the use of the aqueous solutions of the acrylic acid polymers as scale inhibitors in water conducting systems.

The acrylic acid polymers of the invention in particular inhibit the formation of calcium sulfate and calcium carbonate scales on heat transfer surfaces, on membrane surfaces or in pipes.

Water-carrying systems in which the acrylic acid polymers may be used are in particular seawater desalination plants, cooling water systems and boiler feed water systems.

In general, the polymers of the invention are added to the water-conducting systems in amounts of 0.1 mg/l to 100 mg/l. The optimal dosage is determined by the requirements of the respective application or according to the operating conditions of the relevant process. For instance, in thermal seawater desalination, the polymers are preferably used at concentrations of 0.5 mg/l to 10 mg/l. In industrial cooling circuits or boiler feed water systems polymer concentrations of up to 100 mg/l are employed. Water analyses are often carried out in order to determine the proportion of scale-forming salts and thus the optimal dosage.

Formulations may also be added to the water-conducting systems which may comprise, in addition to the polymers of the invention and depending on requirements, inter alia, phosphonates, polyphosphates, zinc salts, molybdate salts, organic corrosion inhibitors such as benzotriazole, tolyltriazole, benzimidazole or ethynyl carbinol alkoxylates, biocides, complexing agents and/or surfactants. Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP) diethylenetriaminepenta(methylenephosphonic acid) (DTPMP) and ethylenediaminetetra(methylenephosphonic acid) (EDTMP) which are all used in the form of their sodium salts.

The acrylic acid polymers according to the invention are also suitable as a constituent of cleaning product, dishwashing detergent and laundry detergent compositions. On account of their soil-dispersing and scale-inhibiting effect, they provide a considerable contribution to the cleaning and rinsing performance of machine dishwashing compositions. For instance, they ensure that no salt deposits of the hardness-forming calcium and magnesium ions remain on the washed dishes. When employed in liquid and solid laundry detergent they actively support the washing performance of the surfactants and prevent graying of the wash due to their soil-dispersing properties. In addition, they act as encrustation inhibitors, i.e. they inhibit the undesired deposition of insoluble salts (e.g. insoluble carbonates and silicates) onto the textile fabric.

The present invention thus also provides for the use of the aqueous solution of the acrylic acid polymers and of the acrylic acid polymers themselves as dispersants and scale inhibitors in laundry detergent, dishwashing detergent and cleaning product compositions.

The invention is illustrated by the following examples.

EXAMPLES

Solution polymers were produced from acrylic acid and sodium hypophosphite which, given identical employed amounts of acrylic acid, water and initiator and an identical or smaller amount of regulator and identical process parameters of temperature, pressure, stirrer speed, total reaction time (t4-t0) (compared to the standard process, ex. 1), exhibited smaller amounts of inorganic phosphorus (m3').

Conduction of the Experiments:

A polymerization vessel having a stirrer was inertized by threefold pressurization with nitrogen and evacuation to 200 mbar. The reaction vessel was under positive pressure for the entire duration of the experiment (0.1-2 bar). The vessel was then filled with the desired amount of water and optionally hypophosphite and heated to reaction temperature. The feeds for acrylic acid, regulator and starter were then started and passed into the vessel at the specified dosing rates (table 1). The vessel contents were commixed by stirring (30-300 rpm). The dosing rates were subject to gravimetric control via a laboratory automation system (Hitec Zang Labmanager). The concentrations of hypophosphite and acrylic acid were monitored by Raman spectroscopy over the course of the experiments. Measurement was accomplished via a Raman probe located directly in the vessel. In addition, samples were taken and analyzed before and after the polymerization (sample amount <1% of vessel contents).

Raman Measurement Conditions for Acrylic Acid and Hypophosphite Concentrations:

Calibration of the spectra was performed with standard solutions of acrylic acid and hypophosphite in the concentration range 0.01 mol/L to 2.0 mol/L in aqueous polyacrylic acid solutions comprising 2 to 70% polyacrylic acid of molar mass Mn=2500 and Mw=5500 g/mol at 50° C. to 100° C.

The integral of the Raman spectrum bands between 2277-2463 $cm^{-1}$ served as a measure for calculating the concentration of hypophosphite. The integration limits vary with process duration due to the change in polarity of the reaction mixture and due to interference with bands of the polymer due to increasing solids content.

The integral of the bands between 1600-1650 cm$^{-1}$ served as a measure for calculating the concentration of acrylic acid. The integration limits likewise vary with process duration. 31P {1H} measurement conditions, hypophosphite measurements:

The content of inorganic phosphorus can be determined by (1H-decoupled) 31P{H} NMR spectroscopy. The proportion of inorganic phosphorus corresponds to the surface integral of the NMR bands in the region of a chemical shift from 0 to 12 ppm, measured via NMR intensity over the entire spectrum.

HPLC Measurement Conditions for Acrylic Acid:

The concentration of acrylic acid during and after the polymerization was determined by HPLC measurement of samples withdrawn from the reactor. Sampling involved adding small amounts of reaction solution into a provided solution of free-radical stopper (hydroquinone) in water at 5° C. HPLC measurement was accomplished by separating the reaction solution by column chromatography on two separating columns:

Precolumn: Bischoff ProntoSIL 120-5-C18ACE-EPS, 5 μm 10×4.0 mm.

Separating column: Bischoff ProntoSIL 120-5-C18ACE-EPS, 5 μm 250×3.0 mm.

The columns were operated with a water/acetonitrile eluent mixture. The sample was dissolved in water/DMSO/acetonitrile and 5 μL were injected into the precolumn. The columns were operated with a flow rate of 0.6 mL/min at 126 bar and 40° C. Detection of the monomer concentration was accomplished by means of UV absorption at 210 nm. HPLC measurement was calibrated with standard solutions of acrylic acid/polyacrylic acid mixtures.

GPC Measurement Conditions for Determination of Molecular Weight Distribution:

The number-average Mn and the weight-average Mw of the molecular weight distribution of the polymer are determined by means of gel permeation chromatography (GPC). The molecular weight distributions were determined by GPC on aqueous solutions of the polymers buffered to pH 7 using hydroxyethyl methacrylate copolymer network (HEMA) as stationary phase and sodium polyacrylate standards.

Calibration (determination of elution curve, molar mass vs elution time) was performed with sodium polyacrylate standards from PSS in the molecular weight range 1250-1 100 000 Da, PSS Poly 5, as described inter alia in M. J. R. Cantow (J. Polym. Sci., A-1, 5(1967)1391-1394), but without the proposed concentration correction.

Molecular weight distributions separated via

PSS Suprema precolumn
PSS Suprema 30
PSS Suprema 1000
PSS Suprema 3000
Eluent: distilled water buffered to pH 7.2

| | |
|---|---|
| Column temperature: | 35° C. |
| Flow rate: | 0.8 mL/min |
| Injection: | 100 μL |
| Concentration: | 1 mg/mL (sample concentration) |
| Detector: | DRI Agilent 1100 UV GAT-LCD 503 [260 nm] Evaluation limit 450 g/mol. |

Use of the Acrylic Acid Polymers as Dispersants

The produced polyacrylic acid solutions were tested for their suitability as dispersants for the production of slurries. To this end, calcium carbonate (Hydrocarb OG from Omya) was in each case ground using a Dispermat. For this, in each case 300 g of calcium carbonate and 600 g of ceramic beads were mixed and initially charged to a 500 ml double-walled vessel filled with tap water. 100 g of a 3 wt % aqueous solution of the polyacrylic acid to be tested was then added after adjustment to pH 5.0 with NaOH. Grinding was effected using a grinding assembly of the type Dispermat AE-C (from VMA-Getzmann) with a cross-beam stirrer at 1200 rpm. Grinding was terminated once 70% of the pigment had a particle size (PSD) of less than 1 μm (about 70 min, LS 13320 particle measuring instrument from Beckman Coulter). After grinding, the slurry was filtered through a 780 μm filter using a porcelain suction filter to remove the ceramic beads and the solids content of the slurry was adjusted to 77%. The viscosity of the slurry was determined immediately, after 1 h, after 24 h and after 168 h using a Brookfield DV II viscometer (using spindle No. 3).

TABLE 1

Dependence of the dispersant property (ensures low viscosity of a CaCO$_3$ dispersion) on the amount of inorganic phosphorus with practically constant molecular weight distribution (examples 1, 5) and with different molecular weight distribution, (examples 1, 3, 7)

| | 0.56% inorg. P (based on polymer) (ex. 1 Mn = 2800 g/mol; Mw = 4800 g/mol) | 0.20% inorg. P (based on polymer); (ex. 5 Mn = 2800 g/mol; Mw = 4800 g/mol) | 0.03% inorg. P (based on polymer) (ex. 3 (Mn = 3300 g/mol; Mw = 7500 g/mol) | 0.46% inorg. P (based on polymer) (ex. 7 Mn 2900 g/mol; Mw = 4700 g/mol) |
|---|---|---|---|---|
| | dynamic viscosity in CaCO3 slurry (mPas) | | | |
| 5 min | 273 | 228 | 313 | 235 |
| 1 h | 395 | 323 | 541 | 360 |
| 24 h | 571 | 430 | 979 | 413 |
| 168 h | 689 | 496 | 1884 | 426 |

Examples 1 and 5 in table 1 show that at constant average molar masses Mn and Mw the reduction in the amount of inorganic phosphorus in the polymer results in an improvement in the dispersing properties of the polymer. The storage stability of the calcium carbonate dispersion is markedly increased (lower viscosity of the slurry after one week of storage).

The examples in table 1 further show that a change in the molecular weight distribution toward higher molecular weights Mn and Mw and toward a broader distribution (larger PDI=Mw/Mn) has a negative effect on the dispersant property for calcium carbonate (ex. 3 compared to ex. 5 and 7). Any product improvement must therefore ensure that a reduction in the amount of inorganic phosphorus in the polymer does not lead to a broadening of the molecular weight distribution.

Control of the concentration ratio [AA]/[P—H] during the polymerization makes it possible to ensure that both Mn and Mw remain constant despite a reduction in the residual amount of inorganic phosphorus.

The examples with polymer numbers 1 and 3 are comparative examples. The examples with polymer numbers 2 and 4 to 8 are inventive examples.

TABLE 2

| | | | | | | | | |
|---|---|---|---|---|---|---|---|---|
| | | | | | [AA]/[P – H] ratio during polymerization | | | |
| no. | residual inorganic phosphorus [m3' % based on polymer content] | residual inorganic phosphorus [% of m3] | average dosing time point of the regulator ($\bar{t}_{do\ sin\ g}$) * in (s) | ($\bar{t}_{do\ sin\ g}$)/ t1 – t1.0 | total SHP (m3/g) | Mn; Mw [g/mol] (PDI) | conversion where [AA]/[P – H] = XX ± 0.5 applies | residual acrylic acid [ppm] |
| 1 | 0.56 | 10.2 | 9000 s | 0.50 | 73.4 | 2800; 4800 (1.7) | 74% (1.5 ± 0.5) | 20 |
| 2 | 0.06 | 1.69 | 5940 s | 0.31 | 50.5 | 3500; 7000 (2.0) | 80% (2.0 ± 0.5) | 16 |
| 3 | 0.03 | 0.757 | 1504 s | 0.08 | 51.4 | 3300; 7500 (2.4) | 46% (1.5 ± 0.5) | 11 |
| 4 | 0.09 | 1.85 | 6221 s | 0.43 | 66.9 | 2900; 5000 (1.7) | 81% (1.5 ± 0.5) | 48 |
| 5 | 0.20 | 4.36 | 7300 s | 0.38 | 61.2 | 2800; 4800 (1.7) | 89% (1.5 ± 0.5) | 25 |
| 6 | 0.17 | 3.18 | 7112 s | 0.37 | 66.4 | 2200; 3600 (1.7) | 85% (1.5 ± 0.5) | 30 |
| 7 | 0.46 | 8.9 | 8450 s | 0.47 | 73.7 | 2900; 4700 (1.6) | 89% (1.5 ± 0.5) | 1 |
| 8 | 0.09 | 0.57 | 5912 s | 0.31 | 141.4 | 1300; 2200 (1.7) | 81% (0.8 ± 0.5) | 15 |

PDI = Mw/Mn
SHP = sodium hypophosphite

TABLE 3

| | | | | |
|---|---|---|---|---|
| | | dosing profile for examples in table 2 | | |
| no. | initial vessel charge | acrylic acid feed (time period [s]) rate [g/s] | NaH2PO2 feed (time period [s])rate [g/s] | persulfate feed (time period [s])rate [g/s] |
| 1 | 420.7 g H$_2$O | (0-18k) 0.068 undiluted | (0-18.0k) 0.01045 40% in water | (0-18.9k) 0.0093 7% in water |
| 2 | 343.2 g H$_2$O | (0-200) 0.042 (200-1500) 0.024→0.04 (1.5k-14k) 0.048→0.096 (14k-19k) 0.087→0.034 undiluted | (0-500) 0.05 (500-14k) 0.0078 40% in water | (0-1k) 0.012 (1k-21k) 0.0059→0.021 7% in water |
| 3 | 229.5 g H$_2$O | (0-200) 0.040 (200-1.9k) 0.1558 (1.9k-5k) 0.1217 (5k-8k) 0.0882→0.0395 (8k-12k) 0.0633 (12k-14k) 0.0438 (14k-16k) 0.0341 (16k-17k) 0.0243 (17k-19k) 0.0049 82% in water | (0-600) 0.1293 (600-5k) 0.0081→0.0129 40% in water | (0-1k) 0.0130 (1k-21k) 0.0061→0.0217 5% in water |
| 4 | 276.1 g H$_2$O | (0-200) 0.046 (200-1500) 0.045→0.062 (1500-14k) 0.052→0.098 (14k-14500) 0.096→0.038 90% in water | (0-600) 0.061 (600-14k) 0.0075→0.012 40% in water | (0-1000) 0.0089 (1000-21000) 0.0042→0.015 5% in water |
| 5 | 397.0 g H$_2$O | (0-200) 0.0059 (200-1k) 0.0098→0.0253 (1k-1.5k) 0.0806→0.1101 (1.5k-14k) 0.047→0.0957 (14k-19k) 0.0867→0.0341 undiluted | (0-500) 0.0372 (500-16k) 0.00869 40% in water | (0-1k) 0.0892 (1k-21k) 0.0042→0.0149 7% in water |
| 6 | 286.4 g H$_2$O | (0-200) 0.0065 (200-1.5k) 0.045→0.062 (1.5k-14k) 0.052→0.098 (14k-19k) 0.096→0.038 90% in water | (0-500) 0.049 (500-14k) 0.0075→0.012 (14k-16k) 0.0049 40% in water | (0-1k) 0.0089 (1k-21k) 0.0042→0.015 6.25% in water |
| 7 | 420.7 g H$_2$O 9.8 g 40% hy-pophosphite in H2O | (0-18k ) 0.068 undiluted | (0-17100) 0.0102 40% in water | (0-18900) 0.009 7% in water |
| 8 | 343.2 g H$_2$O | (0-200) 0.042 (200-1500) 0.024→0.04 (1.5k-14k) 0.048→0.096 (14k-19k) 0.087→0.034 undiluted | (0-500) 0.1 (500-14k) 0.0234 40% in water | (0-1k) 0.012 (1k-21k) 0.0059→0.021 7% in water |

Other process parameters for all experiments: temperature of the reaction mixture: T=95±2° C., internal pressure: p≤2 bar, stirrer speed: 180 rpm. The dosing rates of the three feeds are described as follows: Numbers in brackets define a time interval within the total time for the feed. The first number in the brackets defines the starting value of the interval in seconds, the last number defines the end of the interval. A single number after brackets defines a time-constant dosing rate in g/s for this interval. Two numbers after brackets joined with an arrow define a dosing profile where the dosing rate increases or decreases linearly with time. For example the meaning of the dosing entry for the regulator in example 3 is as follows: In interval 1 "(0-600) 0.1293" means time-constant dosing of the regulator at 0.1293 g/s from 0 seconds process duration to 600 seconds process duration and then in interval 2 "(600-5000) 0.0081→0.0129" means a dosing rate of 0.0081 g/s increasing linearly with time to 0.0129 g/s from time point 600 s to a process duration of 5000 s. Thousand seconds is abbreviated to k. For example, "17 000" is abbreviated to "17 k".

$$\tau_{dosing} = \frac{1}{m3} \int_{t3.0}^{t3} (d(t) * t) dt$$

The invention claimed is:

1. A process for producing aqueous solutions of acrylic acid polymers by polymerization of acrylic acid in feed operation with a free-radical starter in the presence of hypophosphite in water as solvent, which comprises
   (i) initially charging water and optionally acrylic acid in acidic, unneutralized form, optionally one or more ethylenicaliy unsaturated comonomers, optionally aqueous hypophosphite solution, and optionally initiator,
   (ii) adding acrylic acid in acidic, unneutralized form, optionally one or more ethylenicaliy unsaturated comonomers, aqueous free-radical starter solution, and aqueous hypophosphite solution,
   (iii) adding a base to the aqueous solution after termination of the acrylic acid feed,
   wherein the comonomer content does not exceed 30 wt % based on the total monomer content, wherein the acrylic acid, the aqueous free-radical starter solution and the aqueous hypophosphite solution are added such that the molar ratio x of acrylic acid to phosphorus-bound hydrogen [AA]/[P—H] over a time period in which at least 75% of the acrylic acid is converted has a value x which is constant to within ±0.5 and is in the range from 0.8 to 2, that the time-averaged dosing time point for the hypophosphite solution $$\tau_{dosing} = \frac{1}{m3} \int_{t3.0}^{t3} (d(t) * t) dt$$

is 0.3 to 0.47 times the total feed time for the acrylic acid (t1-t1.0), and that the time-averaged dosing time point for the hypophosphite solution is 0.3 to 0.45 times the total feed time for the hypophosphite solution.

2. The process according to claim 1, wherein said process comprises adding continuously at a constant or varying dosing rate or discontinuously the total amount m1 of acrylic acid over a time period (t1-t1.0), the total amount m2 of free-radical starter solution over a time period (t2-t2.0) and the total amount m3 of aqueous hypophosphite solution over a time period (t3-t3.0) and the polymerization takes place in the time period (t4-t4.0), wherein the time points t1.0, t2.0, and t3.0 determine the start of the respective feeds and t4.0 determines commencement of the polymerization.

3. The process according to claim 1, wherein the molar ratio x of acrylic acid to phosphorus-bound hydrogen [AA]/[P—H] over a time period in which at least 75% of the acrylic acid is converted is 1.5±0.5.

4. The process according to claim 1, wherein the total feed time for the hypophosphite solution t3-t3.0 is 80 to 500 min.

5. The process according to claim 1, wherein all feeds commence simultaneously.

6. The process according to claim 1, wherein up to 30 wt % of comonomers selected from the group consisting of methacrylic acid, maleic acid, maleic anhydride, vinylsulfonic acid, allylsulfonic acid, and 2-acrylamido-2-methylpropanesulfonic acid are copolymerized.

7. The process according to claim 1, wherein the polymerization is carried out under an inert gas atmosphere.

* * * * *